(12) United States Patent
Fujishiro et al.

(10) Patent No.: US 12,471,005 B2
(45) Date of Patent: Nov. 11, 2025

(54) COMMUNICATION CONTROL METHOD AND RELAY NODE

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 498 days.

(21) Appl. No.: 17/938,247

(22) Filed: Oct. 5, 2022

(65) Prior Publication Data
US 2023/0052661 A1 Feb. 16, 2023

Related U.S. Application Data

(63) Continuation of application No. PCT/JP2021/014302, filed on Apr. 2, 2021.

(60) Provisional application No. 63/005,566, filed on Apr. 6, 2020.

(51) Int. Cl.
*H04W 48/10* (2009.01)
*H04W 84/04* (2009.01)

(52) U.S. Cl.
CPC .......... *H04W 48/10* (2013.01); *H04W 84/047* (2013.01)

(58) Field of Classification Search
CPC .................................................. H04W 48/10
See application file for complete search history.

(56) References Cited

U.S. PATENT DOCUMENTS

2021/0345226 A1* 11/2021 Liao ...................... H04W 48/18
2022/0038898 A1* 2/2022 Stojanovski .......... H04W 60/04

OTHER PUBLICATIONS

Ericsson, "Draft CR to 36.331 on Integrated Access and Backhaul", 3GPP TSG RAN WG2 Meeting #109-e, R2-2002329, Online, Feb. 24-Mar. 6, 2020, pp. 1-28, URL:https://www.3gpp.org/ftp/tsg_ran/WG2_RL2/TSGR2_109_e/Docs/R2-2002329.zip>.

(Continued)

*Primary Examiner* — Michael T Vu
(74) *Attorney, Agent, or Firm* — Studebaker Brackett PLLC

(57) ABSTRACT

A communication control method according to a first aspect is a method used in cellular communication system including a relay node for relaying communication between a base station and user equipment. The communication control method includes the steps of: broadcasting, by the base station managing a cell belonging to a Non-Public Network (NPN), a system information block including an NPN identifier identifying the NPN to the cell; receiving, by the relay node, the system information block from the base station; and determining, by the relay node, whether an access from the relay node to the cell is permitted, based on the system information block.

5 Claims, 16 Drawing Sheets

(56) References Cited

OTHER PUBLICATIONS

MCC, "Report from SA3#96Ad-Hoc", 3GPP TSG SA3 Meeting #97, S3-193902, Nov. 18-22, 2019, p. 103, Reno, USA, <URL:https://www.3gpp.org/ftp/tsg_sa/WG3_Security/TSGS3_97_Reno/Docs/S3-193902.zip>.
Huawei, Hisilicon, "Correction of TS 36.304 to introduce IAB", 3GPP TSG RAN WG2 Meeting #109 electronic, R2-2002321, Feb. 24-Mar. 6, 2020, total 5 pages, <URL:https://www.3gpp.org/ftp/tsg_ran/WG2_RL2/TSGR2_109_e/Docs/R2-2002321.zip>.
Sony; "IAB cell barring", 3GPP TSG-RAN WG2 #109, R2-2000835, Elbonia, Feb. 24-Mar. 3, 2020, 5 pages.
3rd Generation Partnership Project; Technical Specification Group Radio Access Network; NR; Radio Resource Control (RRC) protocol specification; 3GPP TS 38.331 V16.0.0; Mar. 2020; pp. 1-835; Release 16; 3GPP Organizational Partners.
Kyocera; "IAB support in NPN deployment", 3GPP TSG-RAN WG2 #109bis-e, R2-2003346, Online, Apr. 20-30, 2020, 5 pages.

\* cited by examiner

FIG.7

```
CellAccessRelatedInfo ::=        SEQUENCE {
    plmn-IdentityList            PLMN-IdentityInfoList,
    cellReservedForOtherUse      ENUMERATED {true} OPTIONAL,      -- Need R
    ...                      PLMN IDENTIFIER INFORMATION LIST
}

PLMN-IdentityInfoList ::=        SEQUENCE (SIZE (1..maxPLMN)) OF PLMN-IdentityInfo PLMN-IdentityInfo ::=            SEQUENCE {
    plmn-IdentityList            SEQUENCE (SIZE (1..maxPLMN)) OF PLMN-Identity,
    trackingAreaCode             TrackingAreaCode           OPTIONAL,   -- Need R
    ranac                        RAN-AreaCode               OPTIONAL,   -- Need R
    cellIdentity                 CellIdentity,
    cellReservedForOperatorUse   ENUMERATED {reserved, notReserved},
    ...,
    [[
    iab-Support                  ENUMERATED {true}          OPTIONAL    -- Need R
    ]]
}
```

IAB SUPPORT INFORMATION

FIG.9

```
CellAccessRelatedInfo ::=    SEQUENCE {
    plmn-IdentityList           PLMN-IdentityInfoList,
    cellReservedForOtherUse          ENUMERATED {true} OPTIONAL,       -- Need R
    ...,
    [[
    cellReservedForFutureUse    ENUMERATED {true} OPTIONAL,       -- Need R
    npn-IdentityInfoList        NPN-IdentityInfoList OPTIONAL     -- Need R
    ]]
}
```
NPN IDENTIFIER INFORMATION LIST

```
NPN-IdentityInfoList ::=    SEQUENCE (SIZE (1..maxNPN)) OF NPN-IdentityInfo

NPN-IdentityInfo ::=        SEQUENCE {
    npn-IdentityList            SEQUENCE (SIZE (1..maxNPN)) OF NPN-Identity,
    trackingAreaCode            TrackingAreaCode,
    ranac                       RAN-AreaCode                              OPTIONAL,   -- Need R
    cellIdentity                CellIdentity,
    cellReservedForOperatorUse      ENUMERATED {reserved, notReserved},
    ...
}
```

```
NPN-Identity ::=            CHOICE {
    pni-npn                     SEQUENCE {
        plmn-Identity               PLMN-Identity,
        cag-IdentityList            SEQUENCE (SIZE (1..maxNPN)) OF CAG-Identity
    },
    snpn                        SEQUENCE {
        plmn-Identity               PLMN-Identity,
        nid-List                    SEQUENCE (SIZE (1..maxNPN)) OF NID
    }
}
CAG-Identity ::=            BIT STRING (SIZE (32))
NID ::=                     BIT STRING (SIZE (52))
```

FIG.11

NPN IDENTIFIER INFORMATION LIST

```
NPN-IdentityInfoList ::=         SEQUENCE (SIZE (1..maxNPN)) OF NPN-IdentityInfo NPN-IdentityInfo ::=             SEQUENCE {
    npn-IdentityList                 SEQUENCE (SIZE (1..maxNPN)) OF NPN-Identity,
    trackingAreaCode                 TrackingAreaCode,
    ranac                            RAN-AreaCode                        OPTIONAL,   -- Need R
    cellIdentity                     CellIdentity,
    cellReservedForOperatorUse       ENUMERATED {reserved, notReserved},
    iab-Support                      ENUMERATED {true}                   OPTIONAL
    ...
}
```

IAB SUPPORT INFORMATION

FIG.12

```
CellAccessRelatedInfo ::=      SEQUENCE {
    plmn-IdentityList          PLMN-IdentityInfoList,
    cellReservedForOtherUse        ENUMERATED {true} OPTIONAL,       -- Need R
    ....
    [[
    cellReservedForFutureUse       ENUMERATED {true} OPTIONAL,       -- Need R
    npn-IdentityInfoList       NPN-IdentityInfoList OPTIONAL    -- Need R
    ]]
}
```
PLMN IDENTIFIER INFORMATION LIST

```
PLMN-IdentityInfoList ::=      SEQUENCE (SIZE (1..maxPLMN)) OF PLMN-IdentityInfo PLMN-IdentityInfo ::=          SEQUENCE {
    plmn-IdentityList          SEQUENCE (SIZE (1..maxPLMN)) OF PLMN-Identity,
    trackingAreaCode           TrackingAreaCode                  OPTIONAL,    -- Need R
    ranac                      RAN-AreaCode                      OPTIONAL,    -- Need R
    cellIdentity               CellIdentity,
    cellReservedForOperatorUse     ENUMERATED {reserved, notReserved},
```
IAB SUPPORT INFORMATION
```
    ....
    [[
    iab-Support                ENUMERATED {true}                 OPTIONAL     -- Need R
    ]]
}
```
NPN IDENTIFIER INFORMATION LIST

```
NPN-IdentityInfoList ::=       SEQUENCE (SIZE (1..maxNPN)) OF NPN-IdentityInfo NPN-IdentityInfo ::=           SEQUENCE {
    npn-IdentityList           SEQUENCE (SIZE (1..maxNPN)) OF NPN-Identity,
    trackingAreaCode           TrackingAreaCode,
    ranac                      RAN-AreaCode                      OPTIONAL,    -- Need R
    cellIdentity               CellIdentity,
    cellReservedForOperatorUse     ENUMERATED {reserved, notReserved},
    ...
}
```
NPN IDENTIFIER

```
NPN-Identity ::=               CHOICE {
    pni-npn       FIRST PART   SEQUENCE {
        plmn-Identity              PLMN-Identity,
        cag-IdentityList           SEQUENCE (SIZE (1..maxNPN)) OF CAG-Identity
    },            FIRST PART   SECOND PART
    snpn                       SEQUENCE {
        plmn-Identity              PLMN-Identity,
        nid-List                   SEQUENCE (SIZE (1..maxNPN)) OF NID
    }             SECOND PART
}
CAG-Identity ::=               BIT STRING (SIZE (32))
NID ::=                        BIT STRING (SIZE (52))
```

FIG.13

PLMN IDENTIFIER INFORMATION LIST

```
PLMN-IdentityInfoList ::=        SEQUENCE (SIZE (1..maxPLMN)) OF PLMN-IdentityInfo PLMN-IdentityInfo ::=            SEQUENCE {
    plmn-IdentityList                SEQUENCE (SIZE (1..maxPLMN)) OF PLMN-Identity,
    trackingAreaCode                 TrackingAreaCode         OPTIONAL,    -- Need R
    ranac                            RAN-AreaCode             OPTIONAL,    -- Need R
    cellIdentity                     CellIdentity,
    cellReservedForOperatorUse       ENUMERATED {reserved, notReserved},
                                                                       IAB SUPPORT
[[                                                                     INFORMATION
    iab-Support                      ENUMERATED {true, plmn-only-applicable, npn-only-applicable}
OPTIONAL    -- Need R
]]
}
```

FIG.14

PLMN IDENTIFIER INFORMATION LIST

```
PLMN-IdentityInfoList ::=      SEQUENCE (SIZE (1..maxPLMN)) OF PLMN-IdentityInfo PLMN-IdentityInfo ::=          SEQUENCE {
    plmn-IdentityList              SEQUENCE (SIZE (1..maxPLMN)) OF PLMN-NPN-Identity,
    trackingAreaCode               TrackingAreaCode              OPTIONAL,    -- Need R
    ranac                          RAN-AreaCode                  OPTIONAL,    -- Need R
    cellIdentity                   CellIdentity,
    cellReservedForOperatorUse     ENUMERATED {reserved, notReserved},
    ...                                                                       IAB SUPPORT
    [[                                                                        INFORMATION
    iab-Support                    ENUMERATED {true}             OPTIONAL     -- Need R
    ]]
}
PLMN-NPN-Identity ::=          CHOICE {
    PLMN-Identity                  PLMN-Identity
    NPN-Identity                   NPN-Identity
}
```

COMMUNICATION CONTROL METHOD AND RELAY NODE

RELATED APPLICATIONS

The present application is a continuation based on PCT Application No. PCT/JP2021/014302, filed on Apr. 2, 2021, which claims the benefit of U.S. Provisional Application No. 63/005,566 filed on Apr. 6, 2020. The content of which is incorporated by reference herein in their entirety.

TECHNICAL FIELD

The present disclosure relates to a communication control method and a relay node used in a cellular communication system.

BACKGROUND OF INVENTION

In the 3rd Generation Partnership Project (3GPP), which is a standardization project of a cellular communication system, a study is underway to introduce a new relay node referred to as an Integrated Access and Backhaul (IAB) node. One or more relay nodes are involved in communication between a base station and user equipment, and perform relay for the communication.

In the 3GPP, a study is underway to introduce a private network called a Non-Public Network (NPN). However, a method for communication control in a case that an NPN and an IAB node co-exist is not established.

SUMMARY

A communication control method according to a first aspect is a method used in cellular communication system including a relay node for relaying communication between a base station and user equipment. The communication control method includes: broadcasting, by the base station managing a cell belonging to the Non-Public Network (NPN), a system information block including an NPN identifier identifying the NPN to the cell; receiving, by the relay node, the system information block from the base station; and determining, by the relay node, whether an access from the relay node to the cell is permitted, based on the system information block.

A relay node according to a second aspect is an apparatus for relay communication between a base station and a user device. The relay node includes: a receiver configured to receive a system information block broadcast from the base station managing a cell belonging to the Non-Public Network (NPN) in the cell, the system information block including an NPN identifier identifying the NPN; and a controller configured to determine whether an access from the relay node to the cell is permitted, based on the system information block.

A base station according to a third aspect is a base station managing a cell belonging to the Non-Public Network (NPN). The base station includes a transmitter configured to broadcast a system information block including an NPN identifier identifying the NPN in the cell. The system information block includes relay node support information indicating that the cell supports a relay node for relaying communication between the base station and user equipment.

BRIEF DESCRIPTION OF THE DRAWINGS

FIG. 7 is a diagram illustrating an example of a system information block type 1 (SIB1) broadcast by a donor gNB.

FIG. 9 is a diagram illustrating an example of the SIB1 broadcast in an NPN cell according to an embodiment.

FIG. 11 is a diagram illustrating an example of an NPN identifier information list in the SIB1 in an operation pattern 1 according to an embodiment.

FIG. 12 is a diagram illustrating an example of cell access related information in the SIB1 in operation patterns 2a and 2b according to an embodiment.

FIG. 13 is a diagram illustrating a variation of IAB support information in the operation patterns 2a and 2b according to an embodiment.

FIG. 14 is a diagram illustrating an example of a PLMN identifier information list in the SIB1 in an operation pattern 2c according to an embodiment.

DESCRIPTION OF EMBODIMENTS

A cellular communication system according to an embodiment will be described with reference to the drawings. In the description of the drawings, the same or similar parts are denoted by the same or similar reference signs.

Configuration of Cellular Communication System

Figure 1:
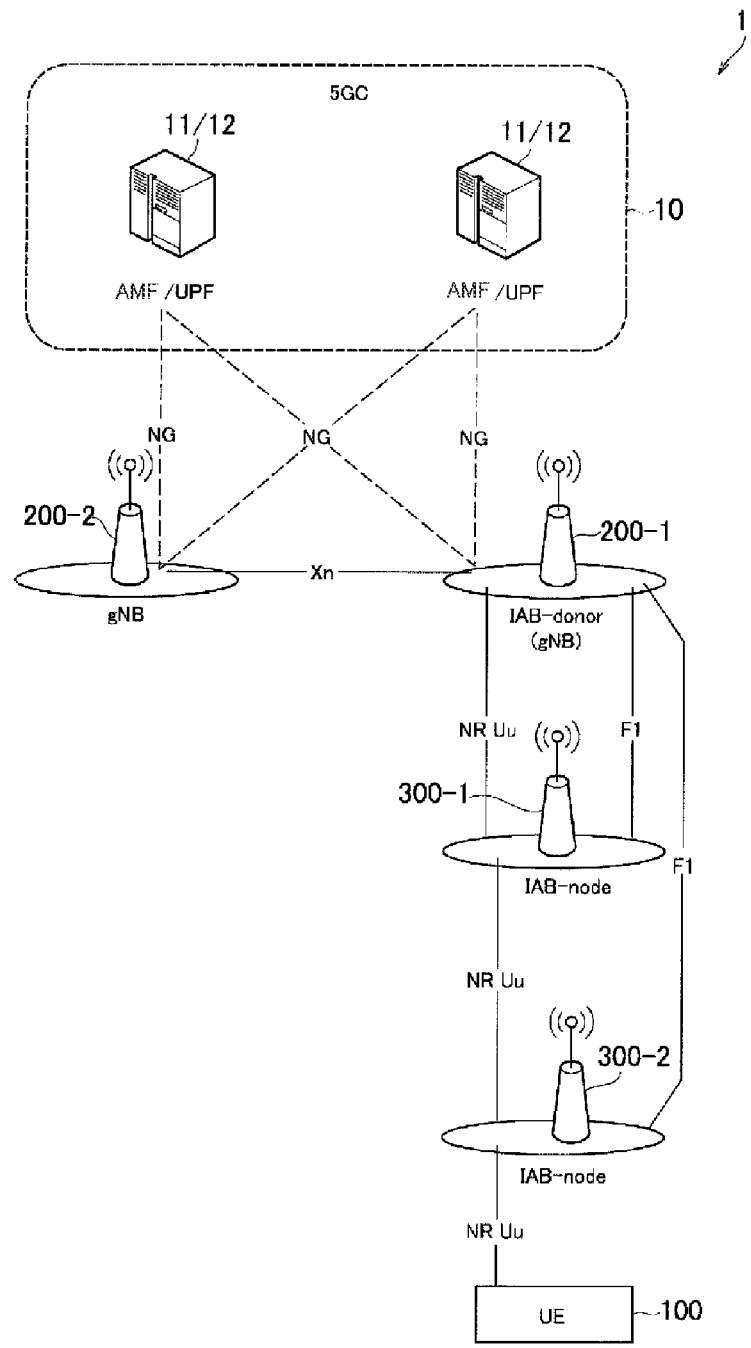
FIG. 1 is a diagram illustrating a configuration of a cellular communication system according to an embodiment.

First, a configuration of the cellular communication system according to an embodiment will be described. FIG. 1 is a diagram illustrating a configuration of a cellular communication system 1 according to an embodiment.

The cellular communication system 1 is a fifth generation (5G) cellular communication system based on the 3GPP standard. Specifically, a radio access scheme in the cellular communication system 1 is New Radio (NR) being a radio access scheme of the 5G. Note that Long Term Evolution (LTE) may be at least partially applied to the cellular communication system 1.

As illustrated in FIG. 1, the cellular communication system 1 includes a 5G core network (5GC) 10, user equipment (UE) 100, a base station (referred to as a gNB) 200, and an IAB node 300. The IAB node 300 is an example of a relay node. An embodiment mainly describes an example in which the base station is an NR base station. However, the base station may be an LTE base station (specifically, an eNB).

The 5GC 10 includes an Access and Mobility Management Function (AMF) 11 and a User Plane Function (UPF) 12. The AMF 11 is an apparatus that performs various types of mobility control and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

Each gNB 200 is a fixed wireless communication node that manages one or more cells. The cell is used as a term denoting a minimum unit of a wireless communication area. The cell may be used as a term denoting a function or a resource for performing wireless communication with the UE 100. One cell belongs to one carrier frequency.

Each gNB 200 is connected to the 5GC 10 via an interface referred to as an NG interface. FIG. 1 illustrates two gNBs, a gNB 200-1 and a gNB 200-2 that are connected to the 5GC 10.

Each gNB 200 is connected to another gNB 200 in an adjacency relationship via an inter-base station interface referred to as an Xn interface. FIG. 1 illustrates an example in which the gNB 200-1 is connected to the gNB 200-2.

Each gNB 200 may be divided into a central unit (CU) and a distributed unit (DU). The CU and the DU are connected to each other via an interface referred to as an F1 interface. The F1 protocol is a communication protocol between the CU and the DU, and includes an F1-C protocol corresponding to a protocol for a control plane and an F1-U protocol corresponding to a protocol for a user plane.

The cellular communication system 1 supports an IAB that uses NR for the backhaul to enable wireless relay of NR access. The donor gNB 200-1 is a gNB 200 corresponding to a terminal node of the NR backhaul on the network side and including additional functions that support the IAB. The backhaul is capable of multi-hop via a plurality of hops (i.e., a plurality of IAB nodes 300).

Each IAB node 300 includes a DU corresponding to a first function unit and a Mobile Terminal (MT) corresponding to a second function unit.

The MT is connected to the DU of an upper node (upper IAB node or a donor gNB 200-1). The MT is connected to the CU of the donor gNB 200-1 by using RRC, and establishes, with the donor gNB 200-1, a signaling radio bearer (SRB) that carries an RRC message and an NAS message. An adjacent node on an NR Uu wireless interface of the MT (i.e., an upper node) may be referred to as a "parent node". A radio link between the MT of the IAB node 300 and the upper node is referred to as a backhaul link (BH link).

The DU manages cells similarly to the gNB 200. The DU terminates the NR Uu wireless interface to the UE 100 and a lower IAB node. The DU supports the F1 protocol for the CU of the donor gNB 200-1. An adjacent node on an NR access interface of the DU (i.e., lower node) may be referred to as a "child node".

All IAB nodes 300 connected to the donor gNB 200-1 via one or more hops form a Directed Acyclic Graph (DAG) topology rooted in the donor gNB 200-1. The DAG topology may be referred to as an IAB topology. In the DAG topology, a direction of the parent node may be referred to as "upstream" or "upper", and a direction of the child node may be referred to as "downstream" or "lower".

An example is illustrated in FIG. 1 in which an IAB node 300-1 is wirelessly connected to the donor gNB 200-1, an IAB node 300-2 is wirelessly connected to the IAB node 300-1, and the F1 protocol is transmitted via two backhaul hops.

The UE 100 is a mobile wireless communication apparatus that performs wireless communication with cells. The UE 100 may be any type of apparatus as long as the UE 100 is an apparatus that performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to an upper node (IAB node 300 or gNB 200) via an access link.

FIG. 1 illustrates an example in which the UE 100 is wirelessly connected to the IAB node 300-2. The UE 100 indirectly communicates with the donor gNB 200-1 via the IAB node 300-2 and the IAB node 300-1. Specifically, the IAB node 300-2 and the IAB node 300-1 relay uplink data from the UE 100 to the donor gNB 200-1 and relay downlink data from the gNB 200-1 to the UE 100.

Figure 2:
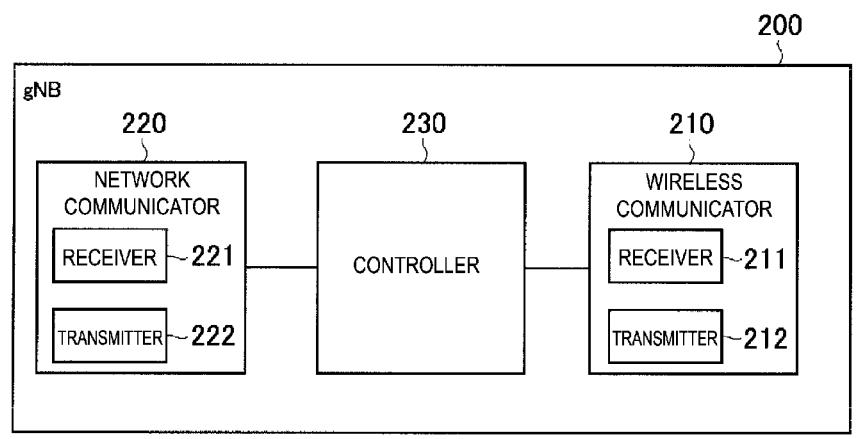
FIG. 2 is a diagram illustrating a configuration of a base station (gNB) according to an embodiment.

A configuration of the gNB 200, corresponding to a base station according to an embodiment, will be described. FIG. 2 is a diagram illustrating a configuration of the gNB 200. As illustrated in FIG. 2, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of receptions under control of the controller 230. The receiver 211 includes an antenna, and converts a radio signal received by the antenna into a baseband signal (received signal) and outputs the baseband signal to the controller 230. The transmitter 212 performs various types of transmissions under control of the controller 230. The transmitter 212 includes an antenna, and converts a baseband signal (transmission signal) output by the controller 230 into a radio signal and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of receptions under control of the controller 230. The receiver 221 receives a signal from the outside and outputs the received signal to the controller 230. The transmitter 222 performs various types of transmissions under control of the controller 230. The transmitter 222 transmits a transmission signal output by the controller 230 to the outside.

The controller 230 performs various types of control for the gNB 200. The controller 230 includes at least one memory and at least one processor electrically connected to the memory. The memory stores programs to be executed by the processor and information to be used for processing by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes. The processor executes processing of layers described below.

Figure 3:
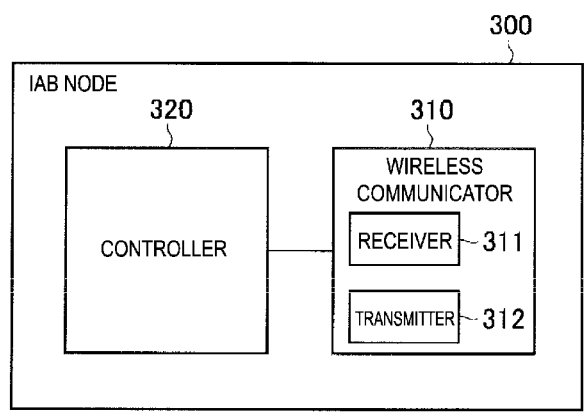
FIG. 3 is a diagram illustrating a configuration of a relay node (IAB node) according to an embodiment.

A configuration of the IAB node 300, corresponding to a relay node according to an embodiment will be described. FIG. 3 is a diagram illustrating a configuration of the IAB node 300. As illustrated in FIG. 3, the IAB node 300 includes a wireless communicator 310 and a controller 320. The IAB node 300 may include a plurality of wireless communicators 310.

The wireless communicator 310 performs wireless communication (BH link) with the gNB 200 and performs wireless communication (access link) with the UE 100. The wireless communicator 310 for the BH link communication and the wireless communicator 310 for the access link communication may be provided separately.

The wireless communicator 310 includes a receiver 311 and a transmitter 312. The receiver 311 performs various types of receptions under control of the controller 320. The receiver 311 includes an antenna, and converts a radio signal received by the antenna into a baseband signal (received signal) and outputs the baseband signal to the controller 320. The transmitter 312 performs various types of transmissions under control of the controller 320. The transmitter 312 includes an antenna, and converts a baseband signal (transmission signal) output by the controller 320 into a radio signal and transmits the radio signal from the antenna.

The controller 320 performs various types of control for the IAB node 300. The controller 320 includes at least one memory and at least one processor electrically connected to the memory. The memory stores programs to be executed by the processor and information to be used for processing by the processor. The processor may include a baseband processor and a CPU. The baseband processor performs modulation and demodulation, and coding and decoding of a baseband signal, and the like. The CPU executes the programs stored in the memory to perform various types of processes. The processor executes processing of the layers described below.

Figure 4:
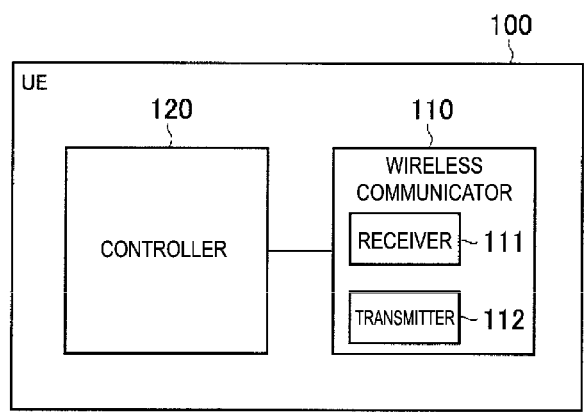
FIG. 4 is a diagram illustrating a configuration of user equipment (UE) according to an embodiment.

A configuration of the UE 100, corresponding to user equipment according to an embodiment, will be described. FIG. 4 is a diagram illustrating a configuration of the UE 100. As illustrated in FIG. 4, the UE 100 includes a wireless communicator 110 and a controller 120.

The wireless communicator 110 performs wireless communication in the access link, specifically, wireless communication with the gNB 200 and wireless communication with the IAB node 300. The wireless communicator 110 may perform wireless communication in the sidelink, in other words, wireless communication with another UE 100. The wireless communicator 110 includes a receiver 111 and a transmitter 112. The receiver 111 performs various types of receptions under control of the controller 120. The receiver 111 includes an antenna, and converts a radio signal received by the antenna into a baseband signal (received signal) and outputs the baseband signal to the controller 120. The transmitter 112 performs various types of transmissions under control of the controller 120. The transmitter 112 includes an antenna, and converts a baseband signal (transmission signal) output by the controller 120 into a radio signal and transmits the radio signal from the antenna.

The controller 120 performs various types of controls for the UE 100. The controller 120 includes at least one memory and at least one processor electrically connected to the memory. The memory stores programs to be executed by the processor and information to be used for processing by the processor. The processor may include a baseband processor and a CPU. The baseband processor performs modulation and demodulation, and coding and decoding of a baseband signal, and the like. The CPU executes the programs stored in the memory to perform various types of processes. The processor executes processing of the layers described below.

Figure 5:
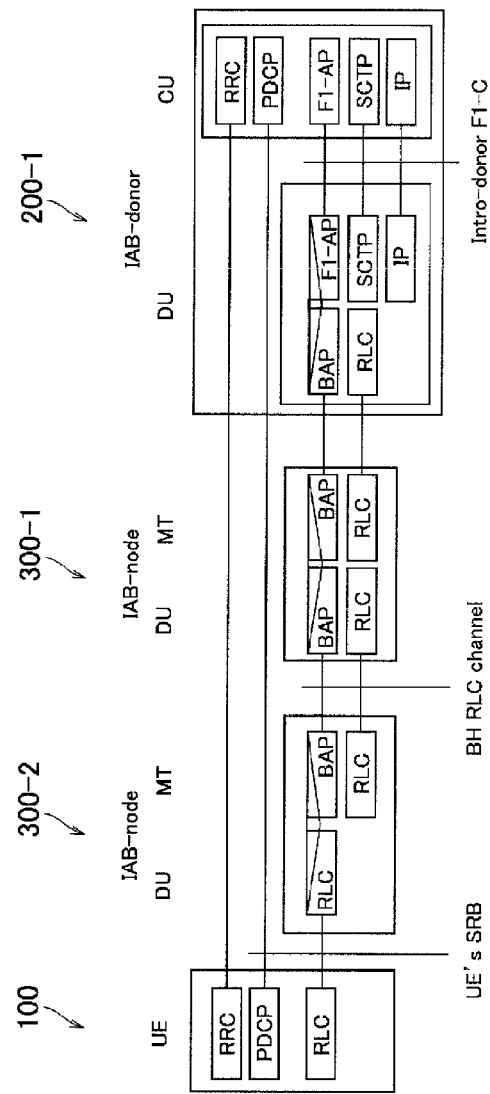
FIG. 5 is a diagram illustrating an example of a protocol stack in the cellular communication system according to an embodiment.
Figure 6:
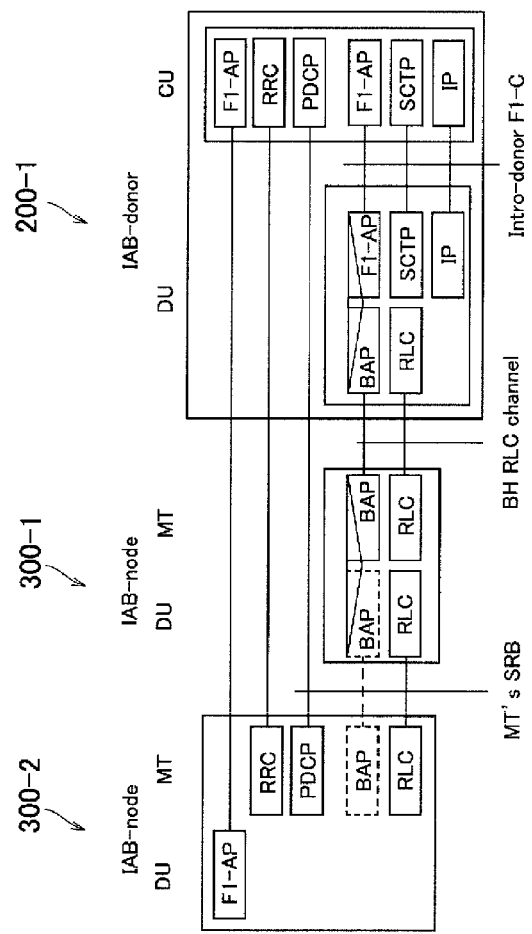
FIG. 6 is a diagram illustrating an example of a protocol stack in the cellular communication system according to an embodiment.

An example of a protocol stack in the cellular communication system 1 according to an embodiment will be described. FIG. 5 and FIG. 6 are diagrams illustrating examples of a protocol stack in the cellular communication system 1 according to an embodiment.

In FIG. 5 and FIG. 6, illustration of a Medium Access Control (MAC) layer and a Physical layer (PHY) layer being lower layers of a Radio Link Control (RLC) layer are omitted. Note that the PHY layer is a layer that performs coding and decoding, modulation and demodulation, antenna mapping and demapping, and resource mapping and demapping. Between the PHY layers, data and control information are transmitted via a physical channel. The MAC layer performs preferential control of data, retransmission processing through a hybrid ARQ (HARQ) and other processing. Between the MAC layers, data and control information are transmitted via a transport channel. The MAC layer of the DU includes a scheduler. By performing scheduling processing, the scheduler determines transport formats (transport block sizes, modulation and coding schemes (MCSs)) in the uplink and the downlink and resource blocks (allocation radio resources) to be allocated to the UE 100.

As illustrated in FIG. 5, the donor gNB 200-1 is divided into the CU and the DU, and includes an F1-C interface (Intra-donor F1-C) between the CU and the DU. A Packet Data Convergence Protocol (PDCP) layer of the CU and a PDCP layer of the UE 100 communicate with each other via the IAB nodes 300-1 and 300-2. The PDCP layer is a layer that performs header compression and decompression, and encryption and decryption. A Radio Resource Control (RRC) layer of the CU and an RRC layer of the UE 100 communicate with each other via the IAB nodes 300-1 and 300-2. The RRC layer transmits RRC signaling for various configurations. The RRC layer controls a logical channel, a transport channel, and a physical channel according to establishment, reestablishment, and release of a radio bearer. When there is RRC connection between the RRC layers, the UE 100 is in an RRC connected state. When there is no RRC connection between the RRC layers, the UE 100 is in an RRC idle state.

In the DU and the MT, a Backhaul Adaptation Protocol (BAP) layer is provided as an upper layer of the RLC layer. The BAP layer is a layer that performs routing processing and bearer mapping and demapping processing. Note that the UE 100 and the DU of the IAB node 300-2 do not include a BAP layer.

As illustrated in FIG. 6, an F1 Application Protocol (F1-AP) layer of the CU and an F1-AP layer of the DU of the IAB node 300-2 communicate with each other via the IAB node 300-1. The RRC layer of the CU and the RRC layer of the MT of the IAB node 300-2 communicate with each other via the IAB node 300-1. The PDCP layer of the CU and the PDCP layer of the MT of the IAB node 300-2 communicate with each other via the IAB node 300-1.

Note that, although illustration is omitted in FIG. 6, the F1-AP layer of the CU and the F1-AP layer of the DU of the IAB node 300-1 communicate with each other. The RRC layer of the CU and the RRC layer of the MT of the IAB node 300-1 communicate with each other. The PDCP layer of the CU and the PDCP layer of the MT of the IAB node 300-1 communicate with each other.

FIG. 7 is a diagram illustrating an example of a system information block type 1 (hereinafter, referred to as an "SIB1") broadcast by the donor gNB 200-1.

The donor gNB 200-1 broadcasts (specifically, transmits on the broadcast channel) the SIB1 for each cell managed by the donor gNB 200-1 itself. In other words, the SIB1 is cell-specific information.

As illustrated in FIG. 7, the SIB1 broadcast in the cell includes cell access related information (CellAccessRelatedInfo) related to access to the cell.

The cell access related information (CellAccessRelatedInfo) includes a Public Land Mobile Networks (PLMN)

identifier information list (PLMN-IdentityInfoList). The PLMN identifier information list includes one or more PLMN identifier information elements (PLMNIdentityInfo). The PLMN identifier information elements include a PLMN identifier list (PLMNIdentityList) containing one or more PLMN identifiers (PLMNIdentity).

The PLMN identifier information list includes IAB support information (iab-Support) associated with the PLMN identifier. The IAB support information is an example of relay node support information. The IAB support information (=true) is information indicating that the cell (the PLMN to which the cell belongs) supports the IAB node 300. Supporting the IAB node 300 means that the cell has capability to handle the IAB node 300 and is an access candidate for the IAB node 300.

Upon receiving the SIB1 in the cell, if the received SIB1 includes the IAB support information (=true), the IAB node 300 regards the cell (the PLMN belonging to the cell) as an access candidate. On the other hand, if the received SIB1 does not include the IAB support information (=true), the IAB node 300 determines that access to the cell (the PLMN belonging to the cell) is prohibited, and does not regard the cell as an access candidate.

NPN

The non-public cellular network (Non-Public Network (NPN)) according to an embodiment will be described. The NPN is a small-scale cellular network that can be used by a specific subscriber. The NPN is, for example, used for the purpose of private wireless communication in a factory. The NPN may be referred to as a private network.

A public cellular network (Public Land Mobile Network (PLMN)), which is a general cellular network, is operated by a telecommunications carrier. For example, a telecommunications carrier operating the PLMN is licensed on a national basis.

On the other hand, the NPN can be flexibly constructed and used by various entities depending on local needs or industrial field-specific needs. The NPN with the 5G cell communication system may be referred to as local 5G. For example, general companies or organization/individuals can receive frequency assignments to operate the NPN by themselves. A license for the NPN may be issued to only a local area, such as in a general company facility.

The NPN includes two types, specifically a stand-alone NPN and a non-stand-alone NPN. The stand-alone NPN is referred to as the Standalone NPN (SNPN), and the non-stand-alone NPN is referred to as a Public Network Integrated NPN (PNI-NPN). The SNPN and the PNI-NPN are hereinafter simply referred to as the NPN unless otherwise distinguished.

Figure 8:
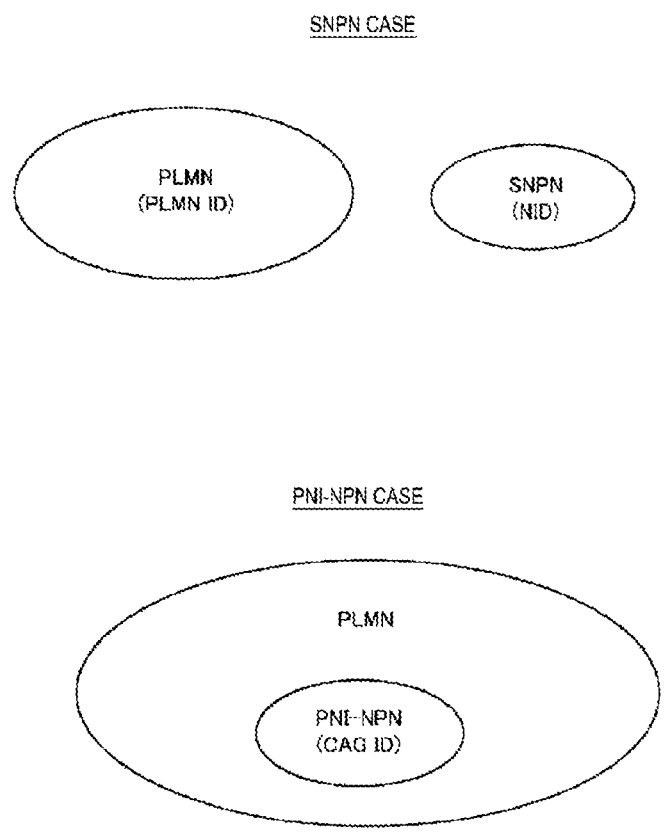
FIG. 8 is a diagram illustrating an NPN (SNPN and PNI-NPN) according to an embodiment.

FIG. 8 is a diagram illustrating the SNPN and the PNI-NPN according to an embodiment.

As illustrated in FIG. 8, the SNPN is independent of the PLMN and does not depend on a network function of the PLMN. On the other hand, the PNI-NPN is configured as part of the PLMN and is capable of network cooperation with the PLMN.

Note that each of the PLMN and the NPN may have an NG-RAN 10 and a 5GC 20. It is assumed that one or more frequencies (frequency bands, carrier frequencies) are allocated to one NPN. One frequency may be allocated to a plurality of geographically separated NPNs. By separating the geographical areas of the NPNs using one frequency, the same frequency can be shared by the plurality of NPNs.

In a case of the SNPN, a network identifier (NID) for identifying the NPN is allocated to the NPN. An NPN cell (gNB 200) broadcasts the NID of the NPN to which the NPN cell belongs (or the NPN for which the NPN cell provides service, or the NPN for which the NPN cell gives permission to access). Specifically, the NPN cell (gNB 200) belonging to the SNPN broadcasts an SNPN identifier as the NPN identifier by the SIB 1. The SNPN identifier is configured by a combination of the PLMN identifier and the NID.

In a case of the PNI-NPN, a Closed Access Group (CAG) identifier as an identifier for identifying the NPN is allocated to the NPN. The NPN cell (gNB 200) broadcasts the CAG identifier of the NPN to which the NPN cell belongs (or the NPN for which the NPN cell provides service, or the NPN for which the NPN cell gives permission to access). Note that the CAG identifier is also an identifier of a group including some specific users that can access the NPN out of subscriber users of the PLMN. Specifically, the NPN cell (gNB 200) belonging to the PNI-NPN broadcasts a PNI-NPN identifier as the NPN identifier by the SIB 1. The PNI-NPN identifier is configured by a combination of the PLMN identifier and the CAG identifier.

FIG. 9 is a diagram illustrating an example of the SIB1 broadcast in the NPN cell. The gNB 200 broadcasts (specifically, transmits, on the broadcast channel) the SIB 1 for each cell managed by the gNB 200 itself.

As illustrated in FIG. 9, the SIB1 broadcast in the NPN cell includes cell access related information (CellAccessRelatedInfo) related to access to the cell.

The cell access related information (CellAccessRelatedInfo) includes a PLMN identifier information list (PLMN-IdentityInfoList) and an NPN identifier information list (NPN-IdentityInfoList).

The NPN identifier information list includes one or more NPN identifier information elements (NPN-IdentityInfo). The NPN identifier information elements include an NPN identifier list (Npn-IdentityList) containing one or more NPN identifiers (NPNIdentity).

Upon receiving the SIB1 in the cell, if the received SIB1 includes the NPN identifier information list and the NPN identifier information list includes the NPN identifier of the NPN in which the UE 100 has an access right (i.e., the NPN selected by the UE 100), the UE 100 regards the cell as an access candidate. If not the above case, the UE 100 determines that access to the cell is prohibited, and does not regard as an access candidate.

Communication Control Method

A communication control method according to an embodiment will be described. In an embodiment, assume a scenario where the IAB node 300 accesses the NPN cell under co-existence of the NPN and IAB nodes.

A configuration of the SIB1 as illustrated in FIG. 9 does not support the IAB node 300. Thus, on receiving the SIB1 like that illustrated in FIG. 9 in the cell, the IAB node 300 determines that the access to the cell is prohibited because the IAB support information is not included in the SIB 1. As a result, the IAB node 300 cannot access the NPN cell.

Figure 10:
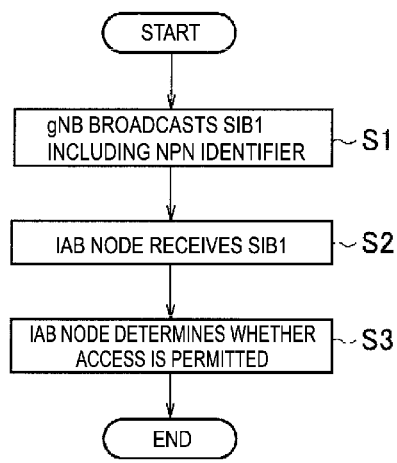
FIG. 10 is a flow chart illustrating a communication control method according to an embodiment.

The communication control method for enabling the IAB node 300 to appropriately access the NPN cell is described below. FIG. 10 is a flow chart illustrating a communication control method according to an embodiment. The communication control method is used in the cellular communication system 1. The cellular communication system 1 includes the IAB node 300 for relaying communication between the gNB 200 and the UE 100.

As illustrated in FIG. 10, the communication control method according to an embodiment includes step S1 in which the gNB 200 managing the cell belonging to the NPN broadcasts the SIB1 including the NPN identifier for identifying the NPN, step S2 in which the IAB node 300 receives the SIB1 from the gNB 200, and step S3 in which the IAB node 300 determines, based on the SIB1, whether access to the cell from the IAB node 300 (hereinafter, referred to as "IAB access") is permitted. Step S3 includes a step of determining whether the IAB access is permitted, depending on whether the SIB1 further includes the IAB support information indicating that the cell supports the IAB node 300.

(1) Operation Pattern 1

An operation pattern 1 according to an embodiment will be described. In the operation pattern 1, the IAB support information is included in the NPN identifier information list.

In other words, in the operation pattern 1, the SIB1 includes the NPN identifier information list. The NPN identifier information list includes one or more NPN identifiers each indicating the corresponding NPN among one or more NPNs to which the cell belongs, and the IAB support information associated with the one or more NPN identifiers included in the NPN identifier information list. Step S3 includes a step of determining whether the IAB access is permitted for the NPN indicated by the NPN identifier, based on the IAB support information included in the NPN identifier information list. This allows the IAB node 300 to appropriately determine whether the IAB access is permitted for each NPN.

FIG. 11 is a diagram illustrating an example of the NPN identifier information list in the SIB1 in the operation pattern 1.

As illustrated in FIG. 11, the NPN identifier information list (NPN-IdentityInfoList) in the SIB1 in the operation pattern 1 includes one or more NPN identifier information elements (NPN-IdentityInfo). The NPN identifier information elements include an NPN identifier list (Npn-IdentityList) containing one or more NPN identifiers (NPNIdentity).

In the operation pattern 1, the NPN identifier information list includes the IAB support information (iab-Support) associated with the NPN identifier. The IAB support information (=true) is information indicating that the cell (the NPN to which the cell belongs) supports the IAB node 300.

To make the IAB access to the selected NPN, first, the IAB node 300 determines whether the NPN identifier of the selected NPN is included in the NPN identifier information list included in the SIB1 broadcast in the cell. If the NPN identifier of the selected NPN is not included in the NPN identifier information list, the IAB node 300 excludes the cell from the access candidate.

Second, if the NPN identifier of the selected NPN is included in the NPN identifier information list, the IAB node 300 determines whether the IAB support information (=true) is associated with the NPN identifier.

Third, if the IAB support information (=true) is associated with the selected NPN identifier, the IAB node 300 determines that the IAB access to the cell is permitted, and regards the cell as an access candidate. On the other hand, if the IAB support information (=true) is not associated with the selected NPN identifier, the IAB node 300 determines that the IAB access to the cell (the NPN to which the cell belongs) is prohibited, and does not regard the cell as an access candidate.

(2) Operation Pattern 2

An operation pattern 2 according to an embodiment will be described. In the operation pattern 2, the IAB support information is included in the PLMN identifier information list.

(2a) Operation Pattern 2a

In an operation pattern 2a, the SIB1 includes the PLMN identifier information list. The PLMN identifier information list includes one or more PLMN identifiers each indicating the corresponding Public Land Mobile Network (PLMN) among one or more PLMNs to which the cell belongs and the IAB support information associated with the one or more PLMN identifiers included in the PLMN identifier information list. Step S3 includes a step of determining whether the IAB access is permitted for the NPN indicated by the NPN identifier, based on the IAB support information included in the PLMN identifier information list.

FIG. 12 is a diagram illustrating an example of cell access related information (CellAccessRelatedInfo) in the SIB1 in the operation pattern 2a.

As illustrated in FIG. 12, the cell access related information (CellAccessRelatedInfo) in the operation pattern 2a is configured by a combination of the PLMN identifier information list (PLMN-IdentityInfoList) illustrated in FIG. 7 and the NPN identifier information list (NPN-IdentityInfoList) illustrated in FIG. 9.

In the operation pattern 2a, the IAB support information (iab-Support) is assumed to be cell-specific information for the NPN. Specifically, for PLMN, the IAB support information is PLMN-specific information (i.e., information notified for each PLMN), but for NPN, the IAB support information is regarded as cell-specific information. The IAB node 300 to make the IAB access to the NPN ignores the PLMN identifier for the IAB support information.

To make the IAB access to the selected NPN, first, the IAB node 300 determines whether the NPN identifier of the selected NPN is included in the NPN identifier information list included in the SIB1 broadcast in the cell. If the NPN identifier of the selected NPN is not included in the NPN identifier information list, the IAB node 300 excludes the cell from the access candidate.

Second, if the NPN identifier of the selected NPN is included in the NPN identifier information list, the IAB node 300 determines whether the IAB support information (=true) is included in the PLMN identifier information list. Here, the IAB node 300 ignores the PLMN identifier in the PLMN identifier information list. However, the IAB node 300 may check only the first entry of the PLMN identifier list (plmn-IdentityList) in the PLMN identifier information list.

Third, if the IAB support information (=true) is included in the PLMN identifier information list, the IAB node 300 determines that the IAB access to the cell is permitted, and regards the cell as an access candidate. On the other hand, if the IAB support information (=true) is not included in the PLMN identifier information list, the IAB node 300 determines that the IAB access to the cell (the NPN to which the cell belongs) is prohibited, and does not regard the cell as an access candidate.

In the operation pattern 2a (and an operation pattern 2b described below), the IAB support information may include information indicating whether the IAB support information is applicable to the NPN. In such a case, step S3 includes a step of determining whether the IAB access is permitted for the NPN indicated by the NPN identifier, depending on whether the IAB support information included in the PLMN identifier information list is applicable to the NPN.

FIG. 13 is a diagram illustrating a variation of IAB support information in the operation patterns 2a (and the operation pattern 2b described below).

As illustrated in FIG. 13, the IAB support information includes any one of information (plmn-only-applicable) indicating that the IAB support information is applicable only to the PLMN, information (npn-only-applicable) indicating that the IAB support information is applicable only to the NPN, or information (true) indicating that the IAB support information is applicable to both the PLMN and the NPN.

If the NPN identifier of the selected NPN is included in the NPN identifier information list, the IAB node 300 determines whether the IAB support information applicable to the NPN (npn-only-applicable or true) is included in the PLMN identifier information list. Then, if the IAB support information applicable to the NPN (npn-only-applicable or true) is included in the PLMN identifier information list, the IAB node 300 determines that the IAB access to the cell is permitted, and regards the cell as an access candidate. On the other hand, if the IAB support information applicable to the NPN (npn-only-applicable or true) is not included in the PLMN identifier information list, in other words, if the IAB support information is not present or the IAB support information is "plmn-only-applicable", the IAB node 300 determines that the IAB access to the cell (the NPN to which the cell belongs) is prohibited, and does not regard the cell as an access candidate.

(2b) Operation Pattern 2b

A configuration of cell access related information (CellAccessRelatedInfo) in the operation pattern 2b is similar to that in the operation pattern 2a. However, the IAB node 300 ignores the PLMN identifier in the PLMN identifier information list in the operation pattern 2a, but in the operation pattern 2b, the IAB node 300 considers the PLMN identifier in the PLMN identifier information list.

As illustrated in FIG. 12, the NPN identifier includes a first part containing the PLMN identifier and a second part containing the CAG identifier or the network identifier (NID). Step S3 includes a step of determining whether the IAB access is permitted for the NPN indicated by the NPN identifier, based on the IAB support information associated with the PLMN identifier matching the first part of the NPN identifier in the PLMN identifier information list. Specifically, if the PLMN identifier information list includes a PLMN identifier matching a PLMN identifier part of the NPN identifier of the NPN ("PLMN identifier+CAG Identifier" or "PLMN identifier+NID"), the IAB node 300 interprets the IAB support information corresponding to the PLMN identifier in the PLMN identifier information list, as the IAB support information for the NPN.

To make the IAB access to the selected NPN, first, the IAB node 300 determines whether the NPN identifier of the selected NPN is included in the NPN identifier information list included in the SIB1 broadcast in the cell. If the NPN identifier of the selected NPN is not included in the NPN identifier information list, the IAB node 300 excludes the cell from the access candidate.

Second, if the NPN identifier of the selected NPN is included in the NPN identifier information list, the IAB node 300 identifies the PLMN identifier in the PLMN identifier information list matching with the PLMN identifier included in the NPN identifier of the selected NPN.

Third, the IAB node 300 determines whether the IAB support information (=true) is associated with the identified PLMN identifier in the PLMN identifier information list. Note that, if the configuration of the IAB support information as illustrated in FIG. 13 is employed, the IAB node 300 may determine whether the IAB support information is applicable to the NPN, as described above.

Fourth, if the IAB support information (=true) is associated with the identified PLMN identifier in the PLMN identifier information list, the IAB node 300 determines that the IAB access to the cell is permitted, and regards the cell as an access candidate. On the other hand, if the IAB support information (=true) is not associated with the identified PLMN identifier in the PLMN identifier information list, the IAB node 300 determines that the IAB access to the cell (the NPN to which the cell belongs) is prohibited, and does not regard the cell as an access candidate.

(2c) Operation Pattern 2c

In an operation pattern 2c, the PLMN identifier information list is configured to include the NPN identifier. Specifically, in the operation pattern 2c, the PLMN identifier information list includes the IAB support information associated with at least one of the PLMN identifier or the NPN identifier included in the PLMN identifier information list. In this manner, moving the NPN identifier to the PLMN identifier information list makes it possible to achieve the IAB access control similar to the PLMN identifier.

FIG. 14 is a diagram illustrating an example of the PLMN identifier information list in the SIB1 in the operation pattern 2c.

As illustrated in FIG. 14, the PLMN identifier information list (PLMN-IdentityInfoList) in the SIB1 in the operation pattern 2c includes one or more PLMN identifier information elements (PLMN-IdentityInfo). The PLMN identifier information elements include an identifier list (PLMN-IdentityList) containing PLMN-NPN-Identity as one or more PLMN identifiers and/or one or more NPN identifiers.

In the operation pattern 2c, PLMN-IdentityList includes the IAB support information (iab-Support) associated with the PLMN identifier or the NPN identifier.

To make the IAB access to the selected NPN, first, the IAB node 300 determines whether the NPN identifier of the selected NPN is included in PLMN-IdentityList included in the SIB1 broadcast in the cell. If the NPN identifier of the selected NPN is not included in PLMN-IdentityList, the IAB node 300 excludes the cell from the access candidate.

Second, if the NPN identifier of the selected NPN is included in PLMN-IdentityList, the IAB node 300 determines whether the IAB support information (=true) is associated with the NPN identifier.

Third, if the IAB support information (=true) is associated with the selected NPN identifier, the IAB node 300 determines that the IAB access to the cell is permitted, and regards the cell as an access candidate. On the other hand, if the IAB support information (=true) is not associated with the selected NPN identifier, the IAB node 300 determines that the IAB access to the cell (the NPN to which the cell belongs) is prohibited, and does not regard the cell as an access candidate.

Variations

Variations of the embodiment described above will be described.

The SIB1 may include access control information to prohibit access to the cell. Such access control information includes at least one of cellReservedForOtherUse, cellReservedForOperatorUse, or cellReservedForFutureUse. As illustrated in FIG. 7 and FIG. 9, these pieces of information are information elements included in CellAccessRelatedInfo. cellReservedForOtherUse is cell-specific information.

cellReservedForOtherUse is, for example, information used for access restrictions when the cell (gNB 200) is under maintenance. If cellReservedForOtherUse is "true", the UE 100 of release 15 of the 3GPP standard determines that access to the cell is prohibited, and does not regard the cell as an access candidate.

cellReservedForOtherUse is an information element introduced at release 15 of the 3GPP standard. The NPN described above is a technique that is introduced at release 16 of the 3GPP standard, and the UE 100 not supporting release 16 (i.e., the UE 100 of release 15) cannot utilize the NPN. Therefore, in order to prohibit access of the UE 100 of release 15, the NPN cell configures cellReservedForOtherUse with "true". Note that the UE 100 of release 16 of the 3GPP standard, specifically, the UE 100 supporting the NPN ignores cellReservedForOtherUse.

cellReservedForOperatorUse is PLMN-specific or NPN-specific information. cellReservedForOperatorUse is, for example, information used for access restrictions when the cell (gNB 200) is used by an operator. If cellReservedForOperatorUse is "reserved", the UE 100 determines that access to the cell is prohibited, and does not regard the cell as an access candidate. On the other hand, if cellReservedForOperatorUse is "notReserved", the UE 100 determines that access to the cell is permitted, and regards the cell as an access candidate. cellReservedForOperatorUse is the information element introduced at release 15 of the 3GPP standard.

cellReservedForFutureUse is cell-specific information. cellReservedForFutureUse is, for example, information used for access restrictions when the cell (gNB 200) is under maintenance. In a case that cellReservedForFutureUse is "true", the UE 100 determines that access to the cell is prohibited, and does not regard the cell as an access candidate.

cellReservedForFutureUse is the information element introduced at release 16 of the 3GPP standard. The NPN cell configures cellReservedForOtherUse to "true" as described above, so cellReservedForOtherUse cannot be used in the original application (e.g., application for indicating whether under maintenance). Therefore, cellReservedForFutureUse is introduced as a new information element in place of cellReservedForOtherUse. The UE 100 of release 15 of the 3GPP standard cannot interpret cellReservedForFutureUse, but the UE 100 of release 16 of the 3GPP standard can interpret cellReservedForFutureUse.

On such an assumption, the IAB node 300 may be considered as an infrastructure-side apparatus, and thus the IAB node 300 may possibly ignore cellReservedForOtherUse and cellReservedForOperatorUse. Note that IAB is a technique that is introduced at release 16 of the 3GPP standard. In an embodiment, the IAB node 300 may also possibly ignore cellReservedForFutureUse. In the following, cellReservedForFutureUse is primarily assumed as an example of the access control information, but the access control information may be at least one of cellReservedForOtherUse or cellReservedForOperatorUse.

Figure 15:
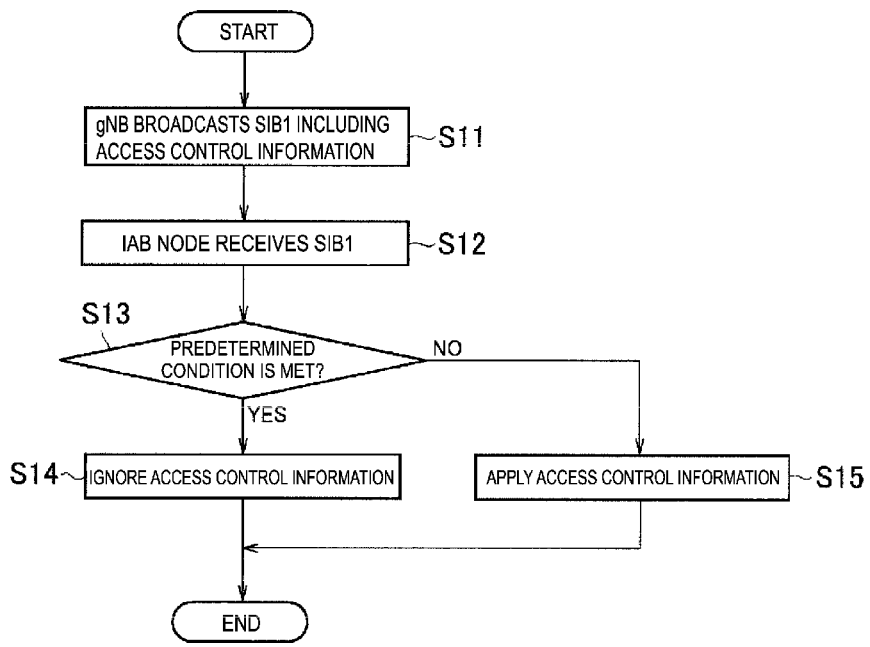
FIG. 15 is a flow chart illustrating a variation of the communication control method according to an embodiment.

FIG. 15 is a flow chart illustrating a communication control method according to the modification example.

As illustrated in FIG. 15, in step S11, the gNB 200 managing the NPN cell broadcasts, in the NPN cell, the SIB1 including the CellAcessRelatedInfo as illustrated in FIG. 9. CellAccessRelatedInfo includes the NPN identifier information list (NPN-IdentityInfoList) and the access control information (cellReservedForFutureUse). The access control information may be associated with the NPN identifier included in the SIB 1.

In step S12, the IAB node 300 receives the SIB1 from the gNB 200.

In step S13, the IAB node 300 determines whether a predetermined condition is met. If the access control information is associated with the NPN identifier, it may be determined whether access is permitted for the NPN indicated by the NPN identifier, based on the access control information associated with the NPN identifier.

The predetermined condition includes at least one of the following conditions. Specifically, the IAB node 300 may determine that the predetermined condition is met when one of the following conditions is met, or may determine that the predetermined condition is met when a combination of two or more conditions of the following conditions is met.

A condition that access to the NPN cell from the IAB node 300 is previously permitted:

For example, IAB access availability to the NPN is previously permitted for the IAB node 300. Such access availability information may be pre-configured to the IAB node 300, or may be configured by an upper layer such as an NAS layer.

A condition that an access type configured for the IAB node 300 is a predetermined type:

For example, the predetermined type refers to a case where an access type configured by the upper layer such as an NAS layer is an IAB access ("JAB node connection") or the like.

A condition that an access class configured for the IAB node 300 is a predetermined class:

The access class is a class previously permitted for the IAB node 300. The predetermined class refers to a case where the access class is AC 10 or higher.

A condition that a communication area range configured for the IAB node 300 is a predetermined area range:

The communication area range may be a communication range of the MT of the IAB node 300. The predetermined area range refers to such as a "narrow area range" or a "wide area range".

A condition that a radio measurement result of measurement by the IAB node 300 for the NPN cell satisfies a threshold condition:

For example, the radio measurement result is Reference Signal Received Power (RSRP) and/or Reference Signal Received Quality (RSRQ). Satisfying the threshold condition refers to a case that the radio measurement result is higher or lower than a threshold.

A condition that the IAB node 300 performs RRC reestablishment for the NPN cell:

For example, the IAB node 300 performs RRC Reestablishment in response to detecting a radio link failure (RLF). During the RRC Reestablishment or upon failure in the RRC Reestablishment (or for a certain period of time after the failure, and the like), the IAB node 300 may be permitted to make the IAB access to the NPN cell.

A condition that the IAB node 300 performs a relay operation after accessing the NPN cell:

If the IAB node 300 is configured to access (attach) a network as the UE 100, and thereafter, operate as the IAB node 300, the IAB node 300 may be permitted to make the IAB access to the NPN cell. Here, the IAB node 300 may access the network by being called on a paging including the identifier of the IAB node 300 itself.

If YES in step S13, in other words, if the predetermined condition is met, the IAB node 300 ignores the access control information included in the SIB 1. This allows the IAB node 300 to determine that the IAB access to the NPN cell is permitted even when cellReservedForFutureUse (=true) is included in the SIB1 broadcast in the NPN cell, for example.

On the other hand, if NO in step S13, in other words, if the predetermined condition is not met, the IAB node 300 applies the access control information included in the SIB 1. This allows the IAB node 300 to determine that the IAB access to the NPN cell is prohibited when cellReservedForFutureUse (=true) is included in the SIB1 broadcast in the NPN cell, for example.

OTHER EMBODIMENTS

Figure 16:
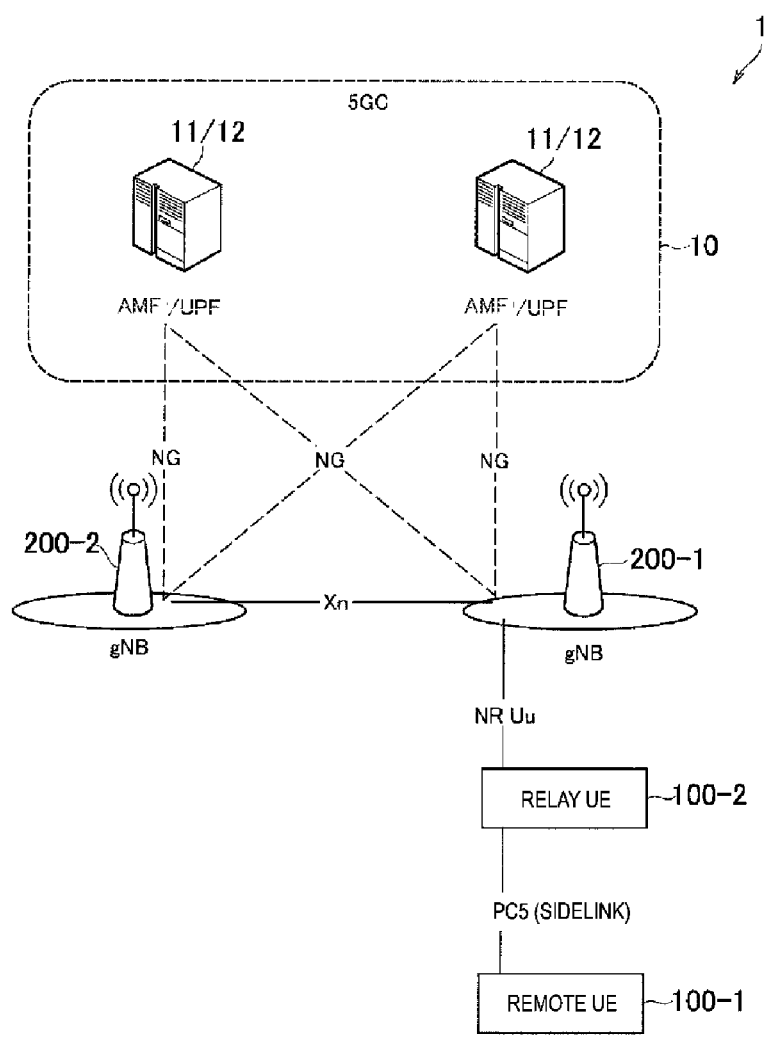
FIG. 16 is a diagram illustrating a variation of the cellular communication system according to an embodiment.

In the above-described embodiment, an example in which the relay node is the IAB node 300 is described. However, the relay node may be relay UE. FIG. 16 is a diagram illustrating a variation of the cellular communication system 1. As illustrated in FIG. 16, the cellular communication system 1 includes the 5GC 10, the gNBs 200-1 and 200-2, remote UE 100-1, and relay UE 100-2. The relay UE 100-2 is an example of the relay node. The remote UE 100-1 is an example of a lower node, and the gNB 200-1 is an example of an upper node. The remote UE 100-1 communicates with the relay UE 100-2 via a PC5 interface (sidelink) that is an inter-UE interface. The relay UE 100-2 communicates with the gNB 200-1 via an NR Uu wireless interface. As a result, the remote UE 100-1 indirectly communicates with the gNB 200-1 via the relay UE 100-2.

In the embodiment described above, an example has been mainly described, in which the cellular communication system 1 is a 5G cellular communication system. However, the base station in the cellular communication system 1 may be an eNB that is an LTE base station. The core network in the cellular communication system 1 may be an Evolved Packet Core (EPC). The gNB can be connected to the EPC, the eNB can be connected to the 5GC, and the gNB and the eNB may be connected via an inter-base station interface (Xn interface, X2 interface).

A program may be provided to cause a computer to execute the processing operations according to the embodiments described above. The program may be recorded in a computer-readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. A chip set may be provided that includes a memory that stores a program for executing each of the processing operations performed by the UE 100, the gNB 200, or the IAB node 300 and a processor that executes the program stored in the memory.

Supplementary Note

Introduction

In a work item for the Integrated Access and Backhaul (IAB), defined are new entities, an IAB donor and an IAB node to enable NR multi-hop and topological networking. Since these entities are considered as network nodes, special processing of the access restrictions is agreed.

- Both the support of the IAB node and the cell status for the IAB node are combined in a single IE. In other words, if the IE is present, the cell supports the IABs and the cell is also regarded as a candidate for the IABs. On the other hand, if the IE is absent, the cell does not support the IAB and/or the cell is barred for the IAB. This IE may be provided for each PLMN.
- IAB-MT ignores cellBarred, cellReservedForOtherUse, and cellReservedForOperatorUse of the IE. Any problem, if defined, will be discussed in the next meeting.
- IAB-MT is not under UAC control.

Another new wave of 5G deployment is to support a private network or the non-public network (NPN). This allows the NPN cell to be identified either by the PLMN ID and NID (for the SNPN) or the PLMN ID and CAG ID (for the PNI-NPN). It is agreed that these network identifiers are broadcast in the SIB1 as external to a legacy PLMN ID information list.

Agreements:

1. Access attempts by Rel-15 UE for emergency services on a CAG cell can be allowed based on the operator's preference.
2. cellReservedForOtherUse is used to prevent Rel-15 UE from accessing the cell.
3. NPN information is outside PLMN-IdentityInfoList as a new Rel-16 IE for NPN-only cell and PLMN+NPN cell (the total number of network IDs is still 12).

Working Assumption:

1. A new Rel-16 IE with a role similar to the role of cellReservedForOtherUse for Rel-15 UE is cell specific.

Rel-16 supporting an IAB function even in the NPN deployment may be considered to be very important in a use case of smart factory that is rapidly growing, for example. Accordingly, this Supplementary Note discusses basic problems in the current agreement between two work items.

Discussion

IAB Support in Non-Public Network

One of the primary requirements of Rel-16 is to support various virtual domains, and one of the strong demands for the 5G deployment is coming from the smart factories. Therefore, a very large number of Rel-16 WIs are intended to meet strict requirements for industrial use cases such as eURLLC and IIoT. In general, industrial users will require private networks for their own facilities to ensure specific security and performance requirements. This is deployed by private network, private slices, or the like. In our opinions, the IAB functions are also very useful in such industrial use cases using the private networks. For example, in the smart factories, the IAB can be deployed quickly with an efficient radio backhaul in an already operating facility, i.e., a retrofit. Consequently, RAN2 should agree to ensure the IAB support in the NPN deployment.

Proposal 1: RAN2 should agree to ensure the IAB function even for the non-public network deployment.

Basic Problem for IAB-MT Access in NPN

In the approved CR for the IAB, the iab-SupportIE is provided in PLMN-IdentityInfoList in the SIB1, as follows.

```
PLMN-IdentityInfoList ::= SEQUENCE (SIZE (1..maxPLMN)) OF
PLMN-IdentityInfo
  PLMN-IdentityInfo ::= SEQUENCE {
  plmn-IdentityList SEQUENCE (SIZE (1..maxPLMN)) OF PLMN-
Identity,
  trackingAreaCode OPTIONAL, -- Need R
  ranac RAN-AreaCode OPTIONAL, -- Need R
  cellIdentity,
  cellReservedForOperatorUse ENUMERATED {reserved, notReserved},
  ...,
  [[
  iab-Support-r16 ENUMERATED {true} OPTIONAL -- Need R
  ]]
  }
```

The IAB-MT regards the cell as being barred unless the iab-Support IE is provided in the selected PLMN or the like.

5.2.2.4.2 Operations Upon Reception of the SIB1

Upon receiving the SIB1, the UE shall:

```
[...]
3> if no iab-Support is provided for the selected PLMN, the registered
PLMN or PLMN of an equivalent PLMN list:
    4> regard the cell as being barred in the IAB-MT in accordance with
TS
38.304.
[...]
```

On the other hand, PRN WI adds npn-IdentityInfoList to support the SNPN (Standalone NPN) and the Public Network Integrated NPN (PNI-NPN). However, because RAN2 agrees to "NPN information is outside PLMN-IdentityInfoList as a new Rel-16 IE for NPN-only cell and PLMN+NPN cell (the total number of network IDs is still 12)", npn-IdentityInfoList is outside the known plmn-IdentityInfoList, as follows.

```
CellAccessRelatedInfo ::= SEQUENCE {
plmn-IdentityList PLMN-IdentityInfoList,
cellReservedForOtherUse ENUMERATED {true} OPTIONAL, -- Need
R
...,
[[
cellReservedForFutureUse-r16 ENUMERATED {true} OPTIONAL, --
Need R
npn-IdentityInfoList-r16 OPTIONAL -- Need R
]]
}
```

Of course, new npn-IdentityInfoList is currently not included in iab-SupportIE, as follows.

```
NPN-IdentityInfoList-r16 ::= SEQUENCE (SIZE (1..maxNPN-r16)) OF
NPN-IdentityInfo-r16
    NPN-IdentityInfo-r16 ::= SEQUENCE {
    npn-IdentityList-r16 SEQUENCE (SIZE (1..maxNPN-r16)) OF NPN-
Identity-r16,
    trackingAreaCode-r16 TrackingAreaCode,
    ranac-r16 RAN-AreaCode OPTIONAL, -- Need R
    cellIdentity-r16    CellIdentity, cellReservedForOperatorUse-r16
ENUMERATED {reserved, notReserved},
    ...
    }
    NPN-Identity-r16 ::= CHOICE {
    pni-npn-r16 SEQUENCE {
    plmn-Identity-r16 PLMN-Identity,
    cag-IdentityList-r16 SEQUENCE (SIZE (1..maxNPN-r16)) OF CAG-
Identity-r16
    },
    snpn-r16 SEQUENCE {
    plmn-Identity PLMN-Identity,
    nid-List-r16 SEQUENCE (SIZE (1..maxNPN-r16)) OF NID-r16
    }
    }
    CAG-Identity-r16 ::= BIT STRING (SIZE (32))
    NID-r16 ::= BIT STRING (SIZE (52))
```

Accordingly, the IAB-MT selecting the NPN regards the NPN cell as being always barred. This means that the IAB is not supported by the NPN deployment until now, but we believe that this is not an intended operation.

Finding 1: The IAB-MT cannot access the NPN cell that is always regarded as being barred because there is no IAB support indication in an NPN identification information list.

In order to enable the IAB in the NPN, iab-Support IE should be added in npn-IdentityInfoList. Further, the text of the procedure should be adapted to the case of the selected NPN. These changes are very simple, but large gain is obtained to broadly support various deployment scenarios of Rel-16 NR.

Proposal 2: RAN2 should agree to add iab-Support IE in npn-IdentityInfoList.

Proposal 3: RAN2 should agree to add the case of NPN in the text of the procedure of SIB1 reception for the iab-Support processing.

An example of implementing the proposals 2 and 3 in TS 38.331 is described in Appendix.

Other Possible Problems

RAN2 agrees to "IAB-MT ignores cellBarred, cellReservedForOtherUse, and cellReservedForOperatorUse of the IE. Any problem, if defined, will be discussed in the next meeting." On the other hand, PRN WI agrees to "cellReservedForOtherUse is used to prevent Rel-15 UE from accessing the cell" and "a new Rel-16 IE with a role similar to the role of cellReservedForOtherUse for Rel-15 UE is cell specific." As such, RAN2 created cellReservedForFutureUse, which is a new IE, for CellAccessRelatedInfo. Therefore, in order to notify the UE of being the NPN cell, as follows, the NPN cell is considered to possibly broadcast the SIB1 along with cellReservedForOtherUse configured with "true" and npn-IdentityInfoList.

```
CellAccessRelatedInfo ::= SEQUENCE {
plmn-IdentityList PLMN-IdentityInfoList,
cellReservedForOtherUse ENUMERATED {true} OPTIONAL, -- Need
R
...,
[[
cellReservedForFutureUse-r16 ENUMERATED {true} OPTIONAL, --
Need R
npn-IdentityInfoList-r16 OPTIONAL -- Need R
]]
}
```

The NPN cell, and also the PLMN cell depending on circumstances, may possibly broadcast cellReservedForFutureUse="true" for some reason such as network maintenance. In this case, it is not clear how the IAB-MT operates. One interpretation is, because the IAB-MT is in agreement with the original usage of cellReservedForOtherUse in Rel-15, regarding the cell as being barred. On the other hand, because RAN2 agrees to "IAB-MT is not under UAC control", another interpretation may be taken that the IAB should also ignore cellReservedForFutureUse. In this case, the IAB-MT is a network node, and thus, may access any cell. From our perspective, any operation is acceptable, but should be made clear in this release for future calibration.

Proposal 4: RAN2 should clarify whether the IAB-MT ignores cellReservedForFutureUse.

Appendix

A variation for TS 38.331 for supporting the IAB in the NPN deployment is as follows.

Variation for Proposal 2

```
NPN-IdentityInfoList-r16 ::= SEQUENCE (SIZE (1..maxNPN-r16)) OF
NPN-IdentityInfo-r16
    NPN-IdentityInfo-r16 ::= SEQUENCE {
    npn-IdentityList-r16 SEQUENCE (SIZE (1..maxNPN-r16)) OF NPN-
Identity-r16,
    trackingAreaCode-r16 TrackingAreaCode,
    ranac-r16 RAN-AreaCode OPTIONAL, -- Need R
```

```
cellIdentity-r16 CellIdentity,
cellReservedForOperatorUse-r16  ENUMERATED  {reserved,
notReserved},
    ...
    [[
    iab-Support-r16 ENUMERATED {true} OPTIONAL -- Need R
    ]]
}
```

Variation for Proposal 3

5.2.2.4.2 Operations Upon Reception of the SIB1
Upon Receiving the SIB1, the UE Shall:
[ . . . ]
3> if no iab-Support is provided for the selected PLMN, the registered PLMN, PLMN of the equivalent PLMN list, or the selected NPN:
4> regard the cell as being barred in the IAB-MT in accordance with TS 38.304.
[ . . . ]

The invention claimed is:

1. A communication control method comprising:
broadcasting, by a cell belonging to a Non-Public Network (NPN), a system information block comprising an NPN identifier identifying the NPN;
receiving, by an Integrated Access and Backhaul (IAB) node configured to perform relaying between a user equipment and a network, the system information block from the cell, the IAB node including a Distributed Unit (DU) and a Mobile Terminal (MT); and
determining, by the IAB node, whether an access from the IAB node to the cell is permitted, based on the system information block, wherein
the system information block further comprises an NPN identifier information list,
the NPN identifier information list comprises the NPN identifier and the IAB node support information associated with the NPN identifier,
the IAB node support information indicates that the cell supports the IAB node configured to perform relaying between the user equipment and the network, and
the determining, by the IAB node, comprises determining whether the access is permitted, based on the IAB node support information comprised in the NPN identifier information list.

2. The communication control method according to claim 1, wherein
the determining comprises
determining that the access is not permitted in response to the IAB node support information associated with a NPN identifier of a selected NPN being not provided in the system information block.

3. The communication control method according to claim 1, wherein the system information block further comprises access control information to prohibit an access to the cell,
the communication control method further comprises determining whether to ignore the access control information by the IAB node, based on whether the IAB node is capable of the NPN.

4. An Integrated Access and Backhaul (IAB) node for relaying communication between a network and user equipment, the IAB node including a Distributed Unit (DU) and a Mobile Terminal (MT), the IAB node comprising:
a receiver configured to receive a system information block broadcast from a cell belonging to a Non-Public Network (NPN) in the cell, the system information block comprising an NPN identifier identifying the NPN; and
a controller configured to determine whether an access from the IAB node to the cell is permitted, based on the system information block, wherein
the system information block further comprises an NPN identifier information list,
the NPN identifier information list comprises the NPN identifier and the IAB node support information associated with the NPN identifier,
the IAB node support information indicates that the cell supports the IAB node, and
the controller is further configured to determine whether the access is permitted, based on the IAB node support information comprised in the NPN identifier information list.

5. An apparatus configured to control an Integrated Access and Backhaul (IAB) node for relaying communication between a network and user equipment, the apparatus comprising a processor and a memory, the processor configured to
receive a system information block broadcast from a cell belonging to a Non-Public Network (NPN) in the cell, the system information block comprising an NPN identifier identifying the NPN; and
determine whether an access from the IAB node to the cell is permitted, based on the system information block, wherein
the system information block further comprises an NPN identifier information list,
the NPN identifier information list comprises the NPN identifier and the IAB node support information associated with the NPN identifier,
the IAB node support information indicates that the cell supports the IAB node, and
the processor is further configured to determine whether the access is permitted, based on the IAB node support information comprised in the NPN identifier information list.

* * * * *